United States Patent

[11] 3,601,593

| [72] | Inventor | Frank S. Preston<br>Fairfield, Conn. |
|---|---|---|
| [21] | Appl. No. | 757,227 |
| [22] | Filed | Sept. 4, 1968 |
| [45] | Patented | Aug. 24, 1971 |
| [73] | Assignee | United Aircraft Corporation<br>East Hartford, Conn. |

[54] INVERSE TANGENT GENERATOR
23 Claims, 25 Drawing Figs.

[52] U.S. Cl.................................................. 235/179,
235/197, 323/64, 318/667
[51] Int. Cl............................................................ G06g 7/26
[50] Field of Search............................................ 235/179,
186, 189, 190, 191, 192, 197; 324/57; 318/18

[56] References Cited
UNITED STATES PATENTS

| 2,872,112 | 2/1959 | Greenwood.................. | 235/192 |
| 3,042,307 | 7/1962 | Booth et al. ................. | 235/197 |
| 3,109,128 | 10/1963 | Pruden et al.................. | 235/186 X |
| 3,158,738 | 11/1964 | Pfeiffer....................... | 235/186 X |
| 3,366,804 | 1/1968 | Heaviside.................... | 235/179 X |
| 3,419,774 | 12/1968 | Hartley....................... | 235/186 X |
| 3,493,735 | 2/1970 | Heaviside et al............. | 235/179 |

OTHER REFERENCES

Erqen: Bridge Electrical Circuits from: The Review of Scientific Instruments Vol. 18 No. 8, p. 564– 567 Aug. 1947

Seay: New Circuit Computes Tangents from: Control Engineering Nov. 1954, p. 59, 60.

*Primary Examiner*—Malcolm A. Morrison
*Assistant Examiner*—Felix D. Gruber
*Attorney*—Shenier and O'Connor

ABSTRACT: Apparatus for generating the inverse tangent function from 0° to 360° to any desired degree of accuracy includes means for mechanizing equations involving the ratios of arithmetic quantities having relatively few terms. Resistance networks may be employed; and two variable elements yield an accuracy of nearly 0.001 second of arc, while three variable elements yield an accuracy better than $2\times10^{19}$ second of arc. Time-sharing permits these accuracies to be obtained with only one variable element. The tangent function may also be generated with corresponding accuracy within a region extending from 0° to somewhat less than 90°.

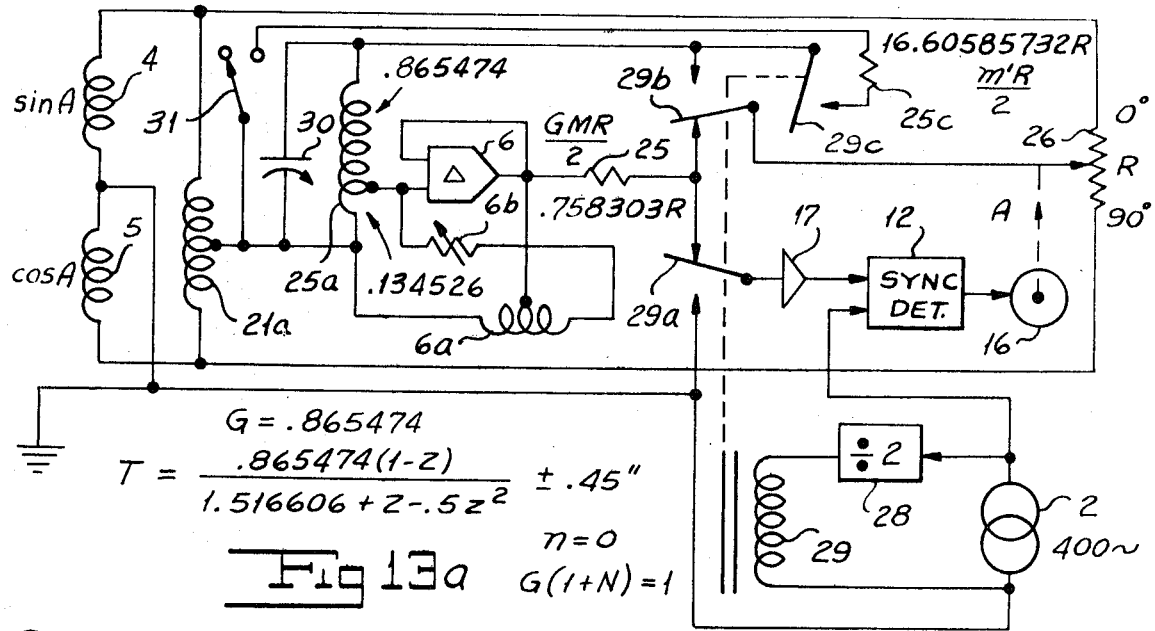
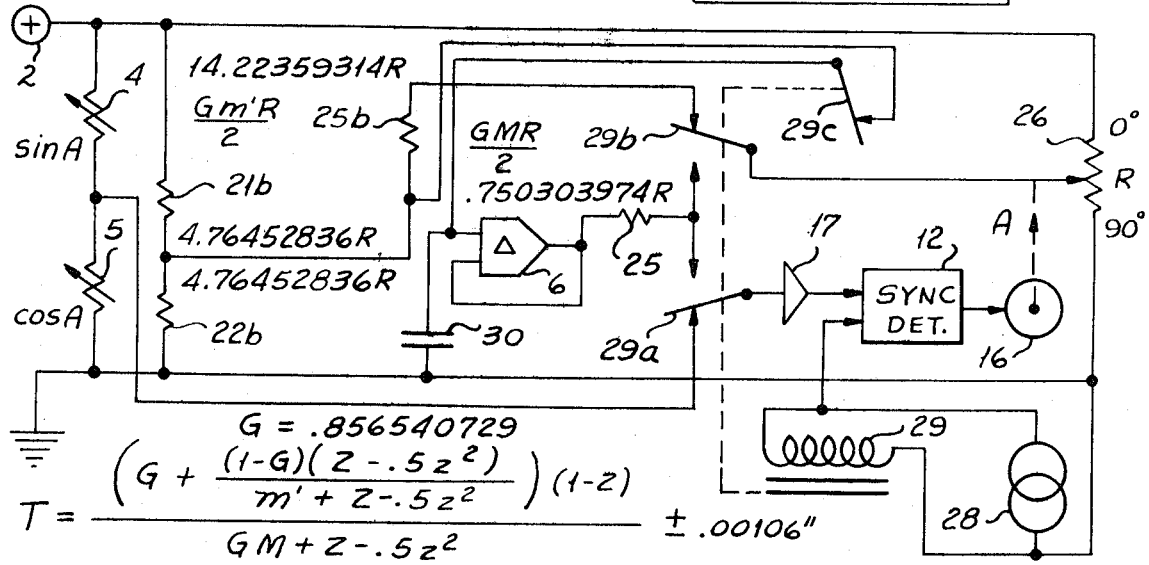
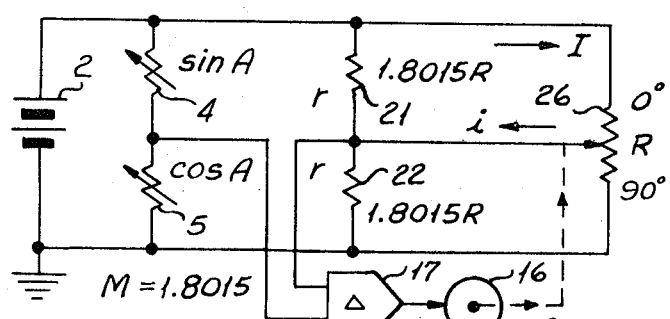

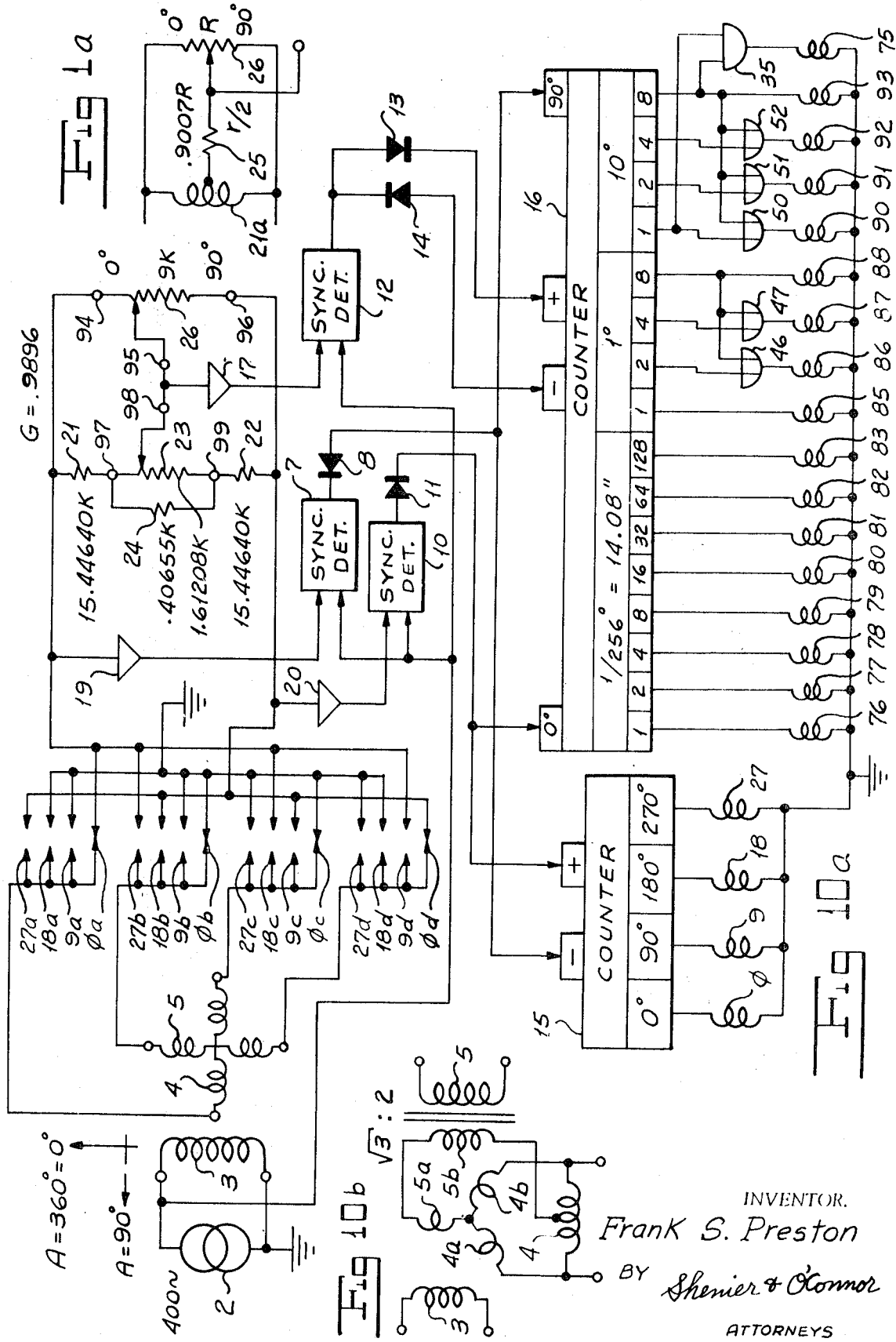

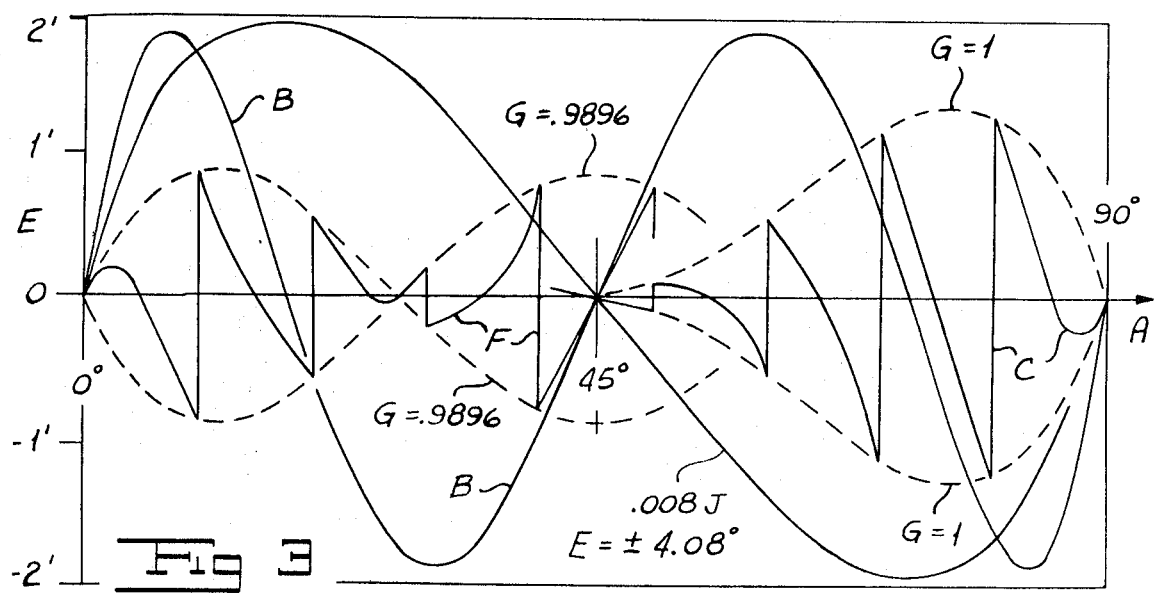
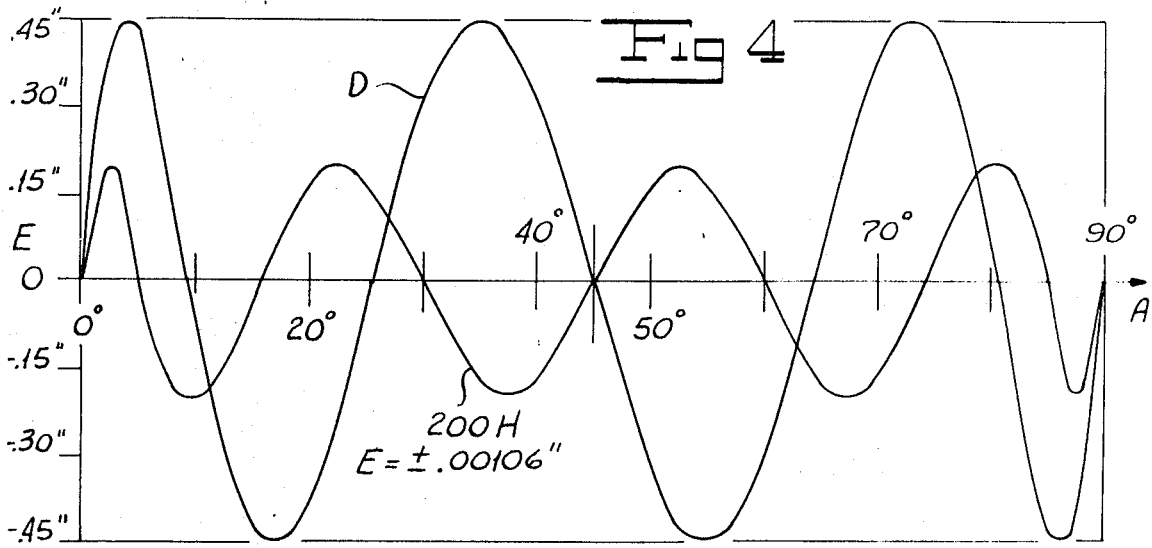
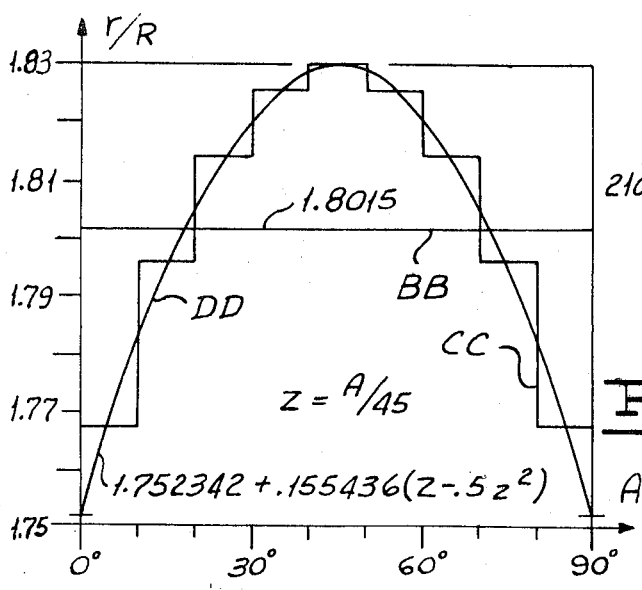
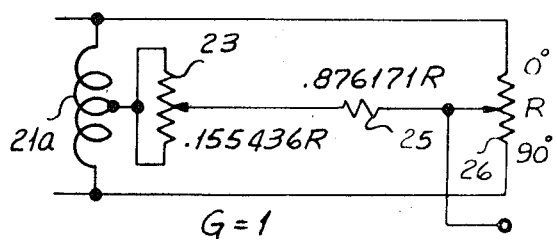

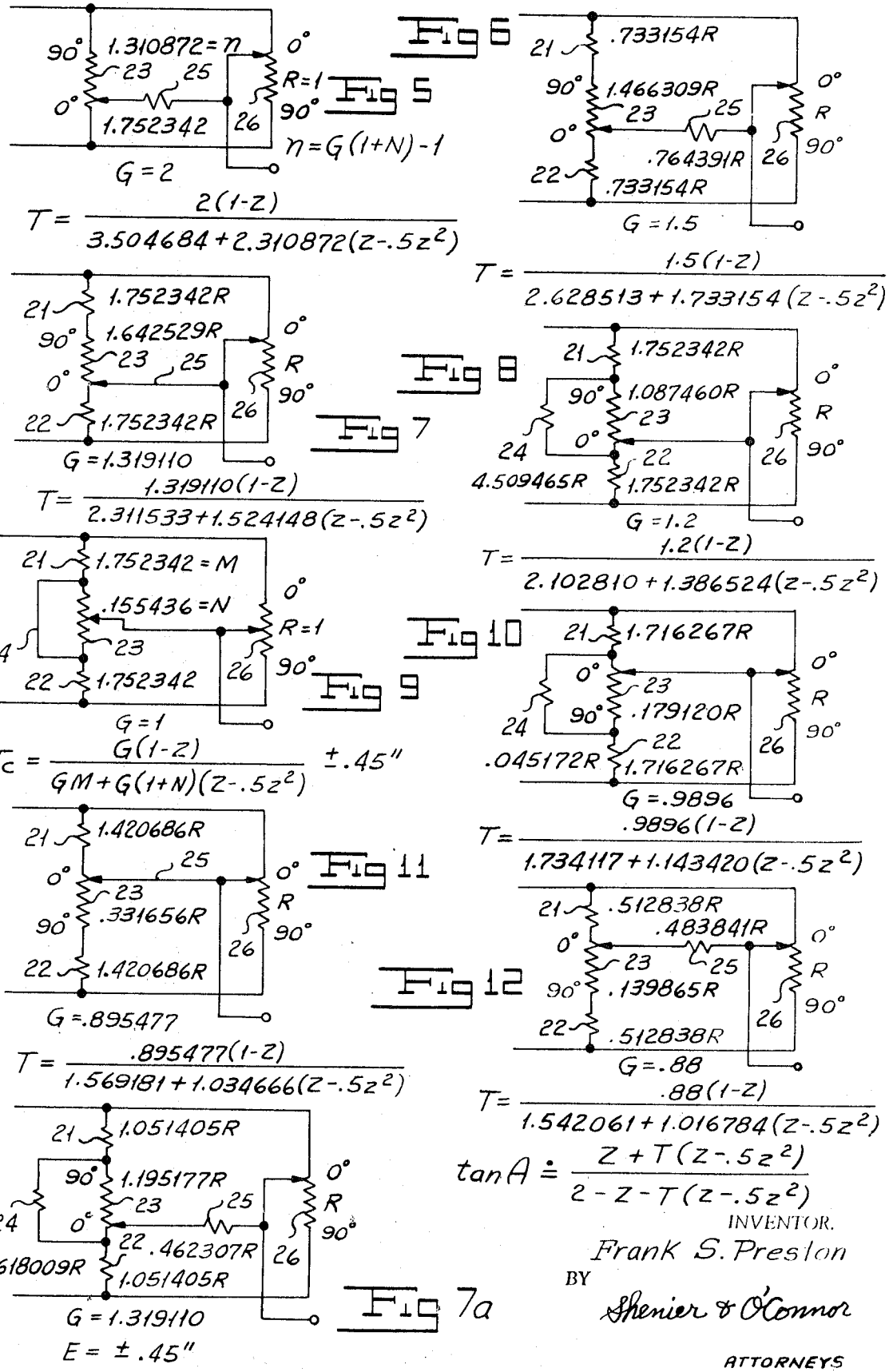

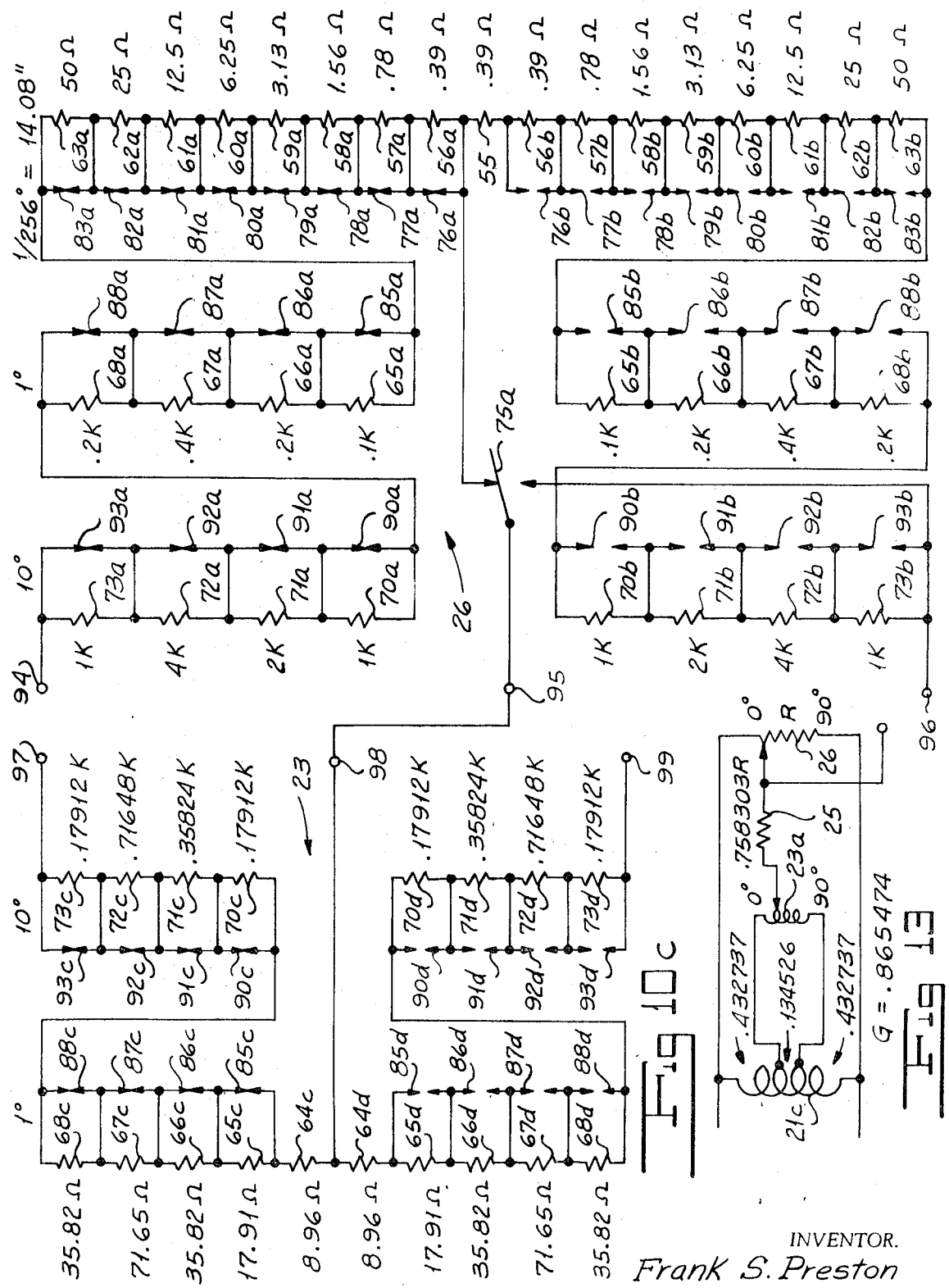

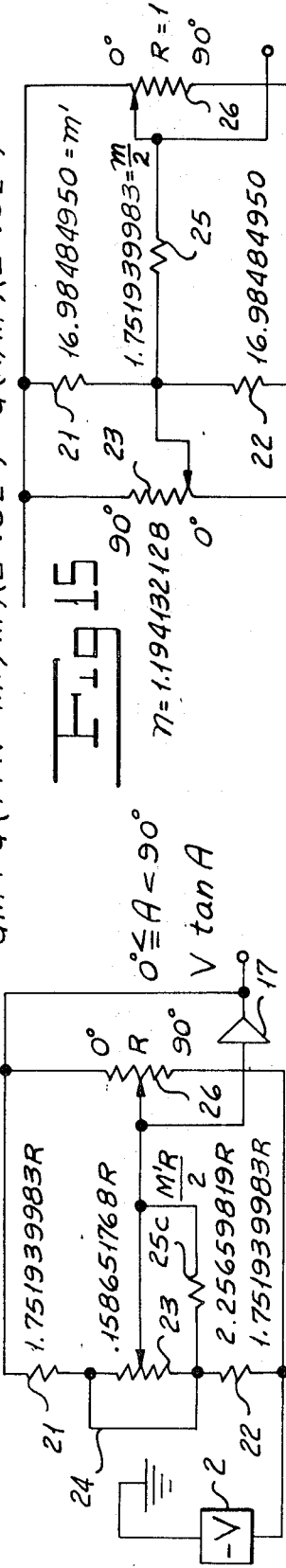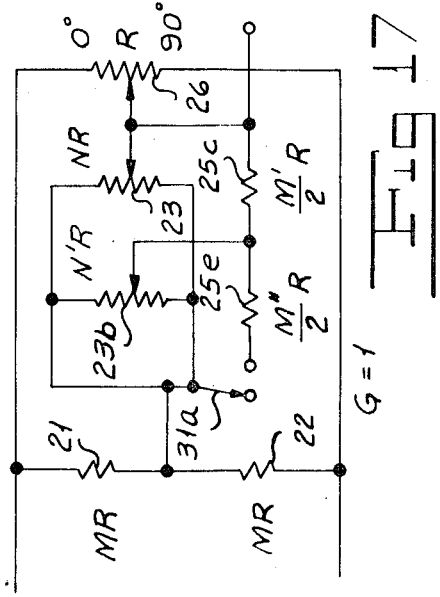

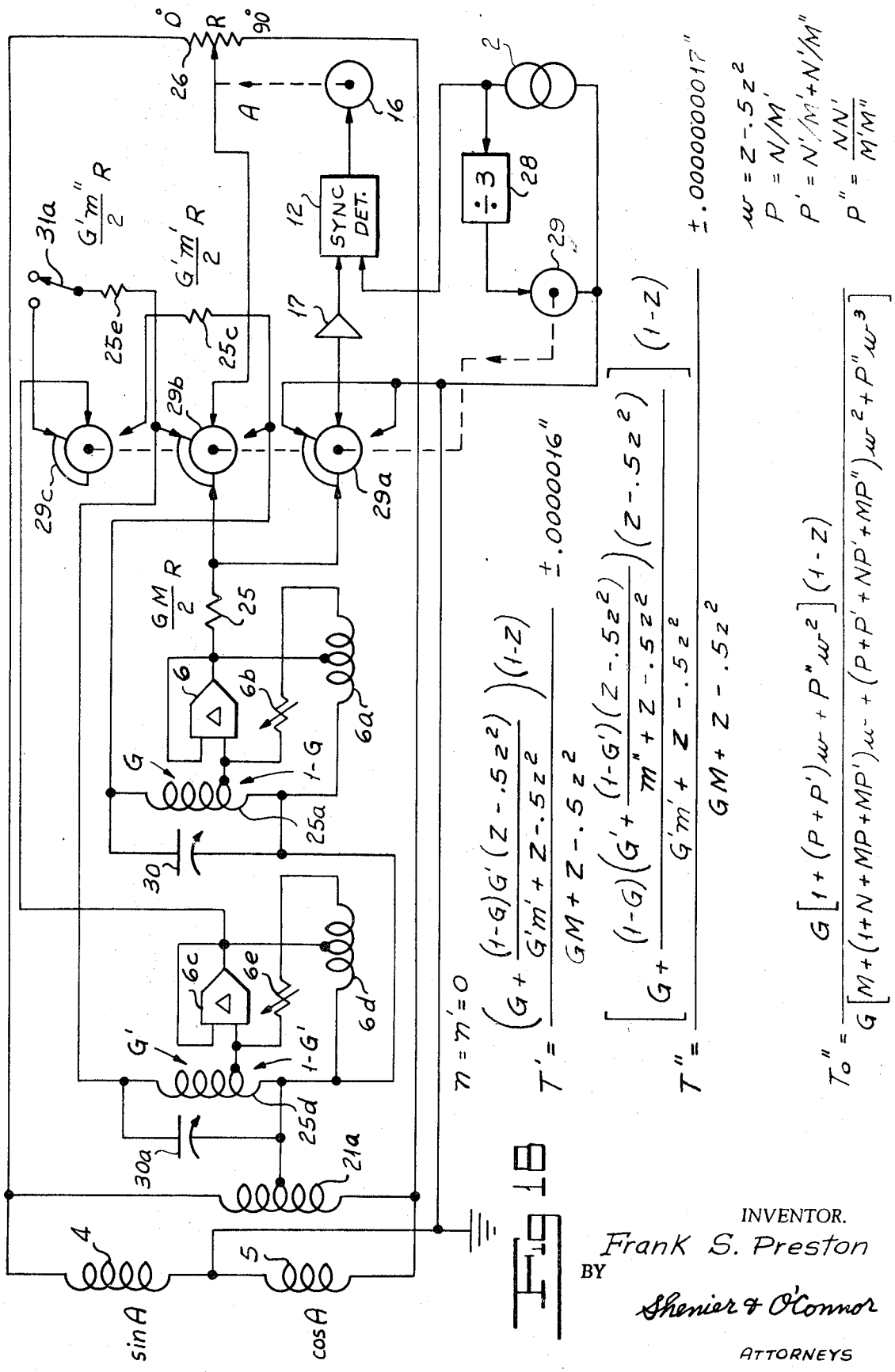

INVERSE TANGENT GENERATOR

BACKGROUND OF THE INVENTION

One inverse tangent generator of the prior art is shown in Preston et al. U.S. Pat. 2,738,924 for Electrical Elevation Angle Computer. The circuit of this patent requires three variable resistance elements to achieve an accuracy of 5 seconds of arc and requires different scale factors for the sine and cosine inputs.

SUMMARY OF THE INVENTION

One object of my invention is to provide an inverse tangent generator which may have any desired degree of accuracy.

Another object of my invention is to provide an inverse tangent generator which is operable through a range from 0° through 360°.

Still another object of my invention is to provide an inverse tangent generator in which extremely high accuracy is achieved with relatively few variable elements.

A further object of my invention is to provide an inverse tangent generator in which the scale factors of the sine and cosine are equal.

Still a further object of my invention is to provide an inverse tangent generator of extremely high accuracy having only one variable element which is time shared.

A still further object of my invention is to provide a tangent function generator of extremely high accuracy which is operable within a region extending from 0° to nearly 90°.

Other and further objects of my invention will appear from the following description.

DESCRIPTION OF THE DRAWINGS

FIG. 1 is a schematic view showing a loaded one-element inverse tangent generator.

FIG. 1a is a fragmentary schematic view showing an embodiment alternative to that of FIG. 1.

FIG. 2 is a graph of relative resistance versus angle for various embodiments of my invention.

FIGS. 3 and 4 are graphs of angular error versus angle for various embodiments of my invention.

FIGS. 5 through 13 are fragmentary schematic views showing various equivalent two-element generators for gain values ranging from G=2 to G=0.865474.

FIGS. 7a and 9a are fragmentary schematic views showing generators alternative to those of FIGS. 7 and 9, respectively.

FIG. 10a is a schematic view showing a digital inverse tangent generator which is supplied by a resolver.

FIG. 10b is a fragmentary schematic view showing the transformation of a synchro input.

FIG. 10c shows the digitally controlled resistance networks of the circuit of FIG. 10a.

FIG. 13a is a schematic view showing a time-shared two-element inverse tangent generator.

FIG. 14 is a schematic view showing a loaded two-element tangent generator.

FIG. 15 is a fragmentary schematic view showing an equivalent loaded two-element generator.

FIG. 16 is a schematic view of a time-shared, loaded two-element inverse tangent generator.

FIG. 17 is a fragmentary schematic view showing a three-element generator.

FIG. 18 is a schematic view of a three-element time-shared inverse tangent generator.

DESCRIPTION OF THE PREFERRED EMBODIMENTS

Referring now to FIG. 1 of the drawings, the negative terminal of a battery 2 is grounded. Shunting battery 2 are series-connected resistors 4 and 5 which are variable in accordance with the respective sine and cosine of an angle A. Also shunting battery 2 is a main potentiometer 26 having a resistance value R. Battery 2 is further shunted by series-connected resistors 21 and 22, each having a value of $r=1.8015R$. The slider of potentiometer 26 is connected to the junction of resistors 21 and 22 and also to one input of a differential amplifier 17. The junction of resistors 4 and 5 is connected to the other input of amplifier 17. The output of amplifier 17 drives a servomotor 16 which positions the slider of potentiometer 26.

In operation of the circuit of FIG. 1, servomotor 16 is driven by the output of amplifier 17 until the slider of potentiometer 26 is so positioned that its output voltage is equal to that at the junction of independently variable resistors 4 and 5. When this occurs, the position of the output shaft of motor 16 represents the angle A, the sine and cosine of which are provided by resistors 4 and 5.

In analyzing the basic circuit of FIG. 1 and, indeed, all other embodiments of my invention, it is convenient to employ the transfer current ratio, T, which is the ratio of the current, $i$, drawn by the slider of potentiometer 26 to the main current, $I$, which would flow through potentiometer 26 if the slider thereof were disconnected from the remaining portion of the circuit. It is also convenient to express angles in degrees as octants of a circle so that $z=A/45$. The range of values of $z$ is from 0 to 2, corresponding to values of A between 0° and 90°. It may be shown that for the circuit of FIG. 1 the transfer current ratio is $Ta=(1-z)/(1.8015+z-\frac{1}{2}z^2)$. While various circuits may have different transfer current ratios, such as $Ta$, $Tc$, and $To$, in each case the following equation applies:

$$\tan A = \frac{z + T(z - \frac{1}{2}z^2)}{2 - z - T(z - \frac{1}{2}z^2)}$$

Referring now to FIG. 3, error curve B shows that the maximum inherent error of the circuit of FIG. 1 is $\pm 1.86'$. It will be noted that the error curve B is symmetrical about 45° and comprises two cycles of error between 0° and 90°.

If in FIG. 1 the resistors 21 and 22 are omitted, then the transfer current ratio is $T=0$. In such event, and referring to FIG. 3, the error is $E=\pm 4.08°$ as shown by the curve 0.008 J. This error curve is symmetrical about 45° and comprises one cycle between 0° and 90°.

FIG. 1a shows an embodiment alternative to FIG. 1 which is suitable for use with alternating current. Potentiometer 26 is shunted by an inductor 21a. A resistor 25 having a value $r/2 = 0.9007R$ is connected between the slider of potentiometer 26 and a center tap of inductor 21a. The transfer current ratio for FIG. 1a is identical to that shown for FIG. 1; and the error curve B of FIG. 3 again applies.

Referring now to FIG. 2, I have found that the errors are considerably reduced when the values, $r$, of resistors 21 and 22 of FIG. 1 are simultaneously varied as shown by the curve DD for which $$r/R = 1.752342 + 0.155436(z - \frac{1}{2}z^2).$$

Referring to FIG. 4, it will be seen that the curve D has an error of $\pm 45''$. Error curve D is again symmetrical about 45° and comprises three cycles between 0° and 90°. In FIG. 2 the curve BB comprising a constant value $r/R=1.8015$ corresponds to the circuit of FIG. 1 and to the error curve B of FIG. 3.

FIG. 9 shows a circuit which generates the resistance curve DD of FIG. 2 and contains the inherent errors shown in curve D of FIG. 4. The junction of resistors 21 and 22 is connected to each of the terminals of an auxiliary potentiometer 23. The slider of potentiometer 23 is connected to the slider of potentiometer 26; and both sliders are ganged for common movement in either the same or in an opposite direction. The values of resistors 21 and 22 are now $1.752342R$; and potentiometer 23 has a resistance value of $0.155436R$. The transfer current ratio for this circuit is $$Tc = \frac{1-z}{1.752342 + 1.155436(z - \frac{1}{2}z^2)}$$

FIG. 9a shows a generator alternative to that of FIG. 9 which is suitable for alternating current. Potentiometer 26 is shunted by an inductor 21a having a center tap which is connected to each of the terminals of potentiometer 23. The slider of potentiometer 23 is coupled to the slider of potentiometer 26 through a resistor 25 having a value of 0.876171R. The transfer current ratio for the circuit of FIG. 9 is identical to that of FIG. 9a.

In considering various circuits equivalent to that of FIG. 9, it is convenient to consider the total Thevinin or open circuit voltage which is operative to produce the flow of transfer current between the sliders of potentiometers 26 and 23. In the circuits of FIG. 9 and 9a, no Thevinin voltage is produced with movement of the slider of potentiometer 23 since it is short circuited. In FIGS. 9 and 9a the total Thevinin voltage is produced solely by movement of the slider of potentiometer 26. The voltage gain G of any generator is the ratio of the total Thevinin voltage to that provided by potentiometer 26. Accordingly, for both FIGS. 9 and 9a the voltage gain is G=1; and the sliders of potentiometers 23 and 26 may move in either the same or opposite directions.

The transfer current ratio is not changed by multiplying numerator and denominator by the same factor G. Referring now to FIG. 5, the given transfer current ratio is obtained from that of FIG. 9 by multiplying numerator and denominator by a factor of two. The numerator immediately establishes that the Thevinin voltage gain is G=2. The terms contained in the denominator of the transfer current ratio are directly applicable to the circuit resistances of FIG. 5. Potentiometer 26 is now shunted directly by potentiometer 23 having a value of 1.310872R. The sliders of potentiometers 23 and 26 are connected by resistor 25 having a value of 1.752342R. In order to achieve the indicated voltage gain G=2, the sliders of potentiometers 23 and 26 move in opposite directions.

The transfer current ratio for FIG. 6 is obtained by multiplying numerator and denominator of that for FIG. 9 by 1.5; so that the Thevinin voltage gain is G=1.5. Potentiometer 26 is now shunted by a series connection of resistor 21, potentiometer 23, and resistor 22. Potentiometer 23 has a value of 1.466309R; and each of resistors 21 and 22 has a value which is one-half that of potentiometer 23. The sliders of potentiometers 23 and 26 are connected through a resistor 25 having a value of 0.764391R. Again, since G is greater than unity, the sliders of potentiometers 23 and 26 move in opposite directions.

FIG. 7 shows a circuit in which G=1.319110. It will be noted that the sliders of potentiometers 23 and 26 are directly connected; and that resistor 25 has zero resistance.

Referring now to FIG. 8, there is shown a circuit in which G=1.2. Potentiometer 23 is shunted by a resistor 24; and the parallel combination of potentiometer 23 and resistor 24 is connected in series with resistors 21 and 22. Again, the auxiliary branch comprising resistors 21 through 24 shunts potentiometer 26. Resistor 24 has a value of 4.509465R. In both FIGS. 7 and 8, the voltage gain is greater than unity; and the sliders of potentiometers 23 and 26 move in opposite directions.

In FIGS. 9 and 9a where the voltage gain is unity, shunting resistor 24 has zero resistance and comprises a short circuit across potentiometer 23.

Referring now to FIG. 10, there is shown a circuit for which G=0.9896. Potentiometer 23 is shunted by a resistor 24 having a value of 0.045172R. Since the voltage gain is less than unity, the sliders of potentiometers 23 and 26 move in the same direction.

FIG. 11 shows a circuit for which G=0.895477. Potentiometer 23 is not provided with a shunting resistor, which is to say that the shunting resistance is infinite. Further, the sliders of potentiometers 23 and 26 are directly connected, which is to say that the value of resistor 25 is zero.

FIG. 12 shows a circuit for which G=0.88. The slider of potentiometer 23 is connected to that of potentiometer 26 through a resistor 25 having a value of 0.483841R. In both FIGS. 11 and 12, the sliders of the potentiometers move in the same directions since the voltage gains are less than unity.

FIG. 13 shows a circuit for which G=0.865474, and which is suitable for alternating current. Potentiometer 26 is shunted by an inductor 21c which is provided with a pair of taps to provide respective voltage ratios of 0.432737, 0.134526, and 0.432737. The taps of inductor 21c are connected across a variable autotransformer 23a having a slider which is connected to that of potentiometer 26 through a resistor 25 having a value of 0.758303R. The voltage gain is less than unity; and the sliders move in the same direction. Autotransformer 23a and inductor 21c are assumed to have zero resistance, since the only operative resistances are resistor 25 and potentiometer 26.

FIGS. 7 and 11 shows the two values of G where the shunting resistance 24 of potentiometer 23 is infinite and where series resistance 25 between the sliders of the potentiometers is zero. FIG. 7a shows a circuit alternative to that of FIG. 7 in which again G=1.319110. In FIG. 7a the values of resistors 21 and 22 were arbitrarily reduced to 60 percent of the values in FIG. 7. A series resistor 25 having a value of 0.462307R must now be connected between the sliders of potentiometers 23 and 26; and potentiometer 23 must now be shunted by a resistor 24 having a value of 5.618009R.

It will be seen that the voltage gain may take on any value between G=0.865474 and G=2; and that for any given value of voltage gain, there are an infinite number of circuits which will yield the desired transfer current ratio. For example, in FIG. 7a, a larger value for resistor 25 will necessitate smaller values for resistors 21, 22, 23, and 24; while a smaller value for resistor 25 will necessitate larger values for resistors 21 through 24. In the limiting case where resistor 25 is zero, resistor 24 becomes infinite; and the circuit of FIG. 7a reduces to that of FIG. 7.

Of all the possible values of voltage gain, I have found that a value G=0.9896 results in minimum sensitivity to errors in the positioning of potentiometer 23. This is of significance especially where the resistance of potentiometer 23 is digitally controlled in discrete steps.

Referring again to FIG. 2, the curve CC shows a nine-step digital approximation to the curve DD where the resistance changes at intervals of 10°. The digitized resistance has the proper value at 5°, 15°, 25°,...,...., and 85°.

Referring again to FIG. 3, curve C shows the errors produced by the digital resistance approximation CC of FIG. 2; and the broken lines G=1 show the envelope of errors for deviations of ±5° in the positioning of the slider of potentiometer 23 of FIGS. 9 and 9a. The envelope has a maximum error of ±1.29′ at 14° and 76°. The envelope is symmetrical about 45° and exhibits no error at 0°, 45°, and 90°, although only half the envelope has been shown.

In FIG. 3, the curve F shows the errors which would be produced in the circuit of FIG. 10 if the slider of potentiometer 23 were digitally stepped at 10° intervals. The broken lines G=0.9896 show the envelope of errors for deviations of ±5° in the positioning of the slider of potentiometer 23. This envelope has a maximum error of ±0.86′ at 12°, 45°, and 78°. The envelope is symmetrical about 45° and exhibits no error at 0°, 27°, 63°, and 90°, although only half the envelope is shown. The value G=0.9896 is optimum, since for smaller values of G, the envelope exhibits much larger errors at 45°. It will be noted that the errors for the envelope G=0.9896 are one-third less than those for G=1.

The envelopes for G=1 and G=0.9896 in FIG. 3 are shown as having equal positive and negative values. In actuality, for displacements as large as ±5° in the positioning of the slider of potentiometers 23, the positive and negative errors for the same values of angle A are slightly different. The envelopes shown correspond to the average of the positive and negative errors. For smaller angular displacements in the positioning of potentiometer 23, the envelopes do exhibit substantially equal positive and negative values at each value of the angle A.

Referring now to FIG. 10a there is shown a complete inverse tangent generator corresponding to FIG. 10 for G=0.9896. A 400 cycle alternating current source 2 supplies the rotor winding 3 of a resolver having stator windings 4 and 5 which are displaced by 90 electrical degrees. One terminal of winding 4 is connected to one contact of each of relay switches Φa, 9a, 18a, and 27a. The other terminal of winding 4 is connected to one contact of each of relay switches Φc, 9c, 18c, and 27c. One terminal of winding 5 is connected to one contact of relay switches Φb, 9b, 18b, and 27b. The other terminal of winding 5 is connected to one contact of relay switches Φd, 9d, 18d, and 27d. The other contact of switches 9a, and 18a, Φb and 9b, 27c and Φc, and 18d and 27d is grounded. The other contact of switches Φa, 27b, 18c, and 9d is connected to the 0° terminal 94 of a 9K potentiometer 26. The other contact of switches 27a, 18b, 9c and Φd is connected to the 90° terminal 96 of potentiometer 26. The values for resistors 21, 22, 24 and potentiometer 23 are as shown in FIG. 10 where R=9K. The junction of the sliders of potentiometers 23 and 26 is coupled through an amplifier 17 to a synchronous detector 12 which is supplied by source 2. Terminal 94 is coupled through an amplifier 19 to a synchronous detector 7; and terminal 96 is coupled through an amplifier 20 to a synchronous detector 10. Detectors 7 and 10 are also supplied by source 2. A four-stage ring counter 15 provides quadrant outputs. The 0° output of counter 15 actuates a relay winding Φ; and the 90°, 180°, and 270° outputs thereof drive respective relay windings 9, 18, 27. Winding Φ controls contacts Φa through Φd; winding 9 controls contacts 9a through 9d; winding 18 controls contacts 18a through 18d; and relay winding 27 controls relay contacts 27a through 27d. A counter 16 provides pure binary outputs for increments of 1/256° and provides binary-coded decimal outputs for increments of 1° and also 10°. Counters 15 and 16 digitally indicate the desired inverse tangent output. The 10°, 20°, and 40° outputs of counter 16 are coupled to respective OR circuits 50, 51, and 52. The 80° output of counter 16 actuates a relay winding 93 and is further coupled to OR circuits 50, 51, and 52, the outputs of which actuate respective relay windings 90, 91, and 92. The 10° and 80° outputs of counter 16 are applied to an AND circuit 35, the output of which drives a relay winding 75. The 1° and 8° outputs of counter 16 actuate respective relay windings 85 and 88. The 8° output of counter 16 is further applied to OR circuits 46 and 47. The 2° and 4° outputs of counter 16 are applied to respective OR circuits 46 and 47, the outputs of which actuate respective relay windings 86 and 87. The 1/256°, 2/256°,..., and 128/256° outputs of counter 16 actuate respective relay windings 76, 77,...,82, and 83. The output of detector 12 is coupled forwardly through a diode 13 to index counter 16 positively, and backwardly through a diode 14 to index counter 16 negatively. The output of detector 19 is coupled forwardly through a diode 11 to index counter 15 positively and reset counter 16 to 0°. The output of detector 7 is coupled backwardly through a diode 8 to index counter 15 negatively and reset counter 16 to 90°. Potentiometers 23 and 26 are simultaneously controlled by windings 75 through 93 as shown and described in FIG. 10c.

FIG. 10b shows the provision of sine and cosine inputs from a synchro having a rotor winding 3 and stator windings 5a, 4a, and 4b. An inductor 4 is connected across windings 4a and 4b. The primary winding 5b of a transformer is connected between winding 5a and a center tap of inductor 4. The turns ratio between the primary winding 5b and the secondary winding 5 of the transformer is √3:2.

FIG. 10c shows the digitally controlled potentiometer indicated generally by the reference numeral 26. Between terminals 94 and 95, there is provided a plurality of series-connected resistors, each of which is shunted by a normally closed relay contact. Between terminals 95 and 96, there is provided a corresponding plurality of series-connected resistors, all but one of which is shunted by a normally open relay contact. Directing our attention for the moment to those resistors connected between terminals 94 and 95, 10° increments are provided by resistors 70a through 73a, having respective values of 1K, 2K, 4K, and 1K, which are shunted by respective contacts 90a through 93a. Increments of 1° are provided by resistors 65a through 68a, having respective values of 0.1K, 0.2K, 0.4K, and 0.2K, which are shunted by respective contacts 85a through 88a. Fractional degree increments are provided by resistors 56a through 63a, having respective values of 0.39, 0.78, 1.56, 3.13, 6.25, 12.5, 25 and 50 ohms, which are shunted by respective contacts 76a through 83a.

The resistors connected between terminals 95 and 96 are similarly arranged. For example, 10° increments are provided by resistors 70b through 73b which are shunted by respective contacts 90b through 93b; 1° increments are provided by resistors 65b through 68b which are shunted by respective contacts 85b through 88b; and fractional degree increments are provided by resistors 56b through 63b which are shunted by respective contacts 76b through 83b. The resistance between terminals 95 and 96 further includes a series-connected resistor 55 having a value of 0.39 ohm. Terminal 95 is normally connected through a relay switch 75a to the junction of resistors 55 and 56a in order to provide the foregoing distribution of resistors between terminal 95 and terminals 94 and 96. However, switch 75a may be actuated by relay winding 75 to connect terminal 95 directly to terminal 96 and place all series-connected resistors between terminals 94 and 95.

FIG. 10c shows further digitally controlled potentiometer indicated generally by the reference numeral 23. Between terminals 97 and 98, there is provided a plurality of series-connected resistors, all but one of which is shunted by a normally closed relay contact; and between terminals 98 and 99 there is provided a corresponding plurality of series-connected resistors, all but one of which is shunted by a normally open relay contact. Directing our attention for the moment to those resistors connected between terminals 97 and 98, 10° increments are provided by resistors 70c through 73c having respective values of 0.17912K, 0.35824K, 0.71648K, and 0.17912K, which are shunted by respective contacts 90c through 93c. Increments of 1° are provided by resistors 65c through 68c having respective values of 17.91, 35.82, 71.65, and 35.82 ohms, which are shunted by respective contacts 85c through 88c. Serially connected between terminals 97 and 98 is a further resistor 64c having a value of 8.96 ohms which is not shunted by any contact.

The resistors connected between terminals 98 and 99 are similarly arranged. For example, 10° increments are provided by resistors 70d through 73d which are shunted by respective contacts 90d through 93d; increments of 1° are provided by resistors 65d through 68d which are shunted by respective contacts 85d through 88d. The resistance between terminals 98 and 99 further includes a series-connected resistor 67d having a value of 8.96 ohms, which is not shunted by any contact. Relay windings 75 through 83, 85 through 88, and 90 through 93 of FIG. 10a control corresponding contacts of the relay switches of digitally controlled potentiometers 26 and 23 of FIG. 10c. For example, winding 93 controls contacts 93a, 93b, 93c, and 93d; winding 85 controls contacts 85a through 85d; winding 83 controls contacts 83a and 83b; and winding 76 controls contacts 76a and 76b.

In operation of the circuit of FIG. 10a, when rotor winding 3 is between 0° and 90°, counter 15 provides a 0° output which energizes winding Φ to close contacts Φa through Φd. Winding 4 provides a positive sine output which is coupled to terminal 94; and winding 5 provides a negative cosine which is coupled to terminal 96. The system nulls with the input of amplifier 17 at ground potential. If the input of amplifier 17 is positive, then detector 12 provides positive pulses which are coupled through diode 13 to index counter 16 to larger outputs. Similarly, if the input of amplifier 17 is negative, then detector 12 provides negative pulses which are coupled through diode 14 to index counter 16 to smaller outputs. With rotor winding 3 positioned a few seconds less than 90°, the polarity of the negative cosine input at terminal 96 is still negative, producing a negative output form detector 10. This is blocked by diode 11, so that counter 15 still provides a 0° output while counter 16 provides an output of 90°. When rotor winding 3 is positioned a few seconds more than 90°, the signal at terminal 96 becomes positive. This produces a positive pulse from detector 10 which is coupled through diode 11 to index counter 15 to 90° and reset counter 16 to 0°. the net count is not changed since 0°+90°=90°+0°. Winding 9 is energized which actuates contacts 9a through 9d and disables contacts Φa through Φd. In the second quadrant between 90° and 180°, the cosine is negative; and winding 5 is applied with negative polarity to terminal 94, so that the input signal to amplifier 19 is positive; and winding 4 is applied with negative polarity to terminal 96, so that the input of amplifier 20 is negative. Detector 10 similarly indexes counter 15 to 180°, 270°, and 0° again as winding 3 moves through these angular positions. It will be seen that during counterclockwise rotation of winding 3, synchronous detector 10 successively indexes counter 15 to increasing outputs while resetting counter 16 to zero. Clockwise rotation of winding 3 is under the control of amplifier 19 and synchronous detector 7, which indexes counter 15 negatively and resets counter 16 to 90°. For example, if rotor winding 3 is rotated clockwise to a few seconds less than 0°=360, the input of amplifier 19 becomes negative, providing a negative-going pulse from detector 7 which is coupled through rectifier 8, indexing counter 15 from 0° to 270° and resetting counter 16 to 90°. The net count is not changed since 270°+90bL=360°=0°. Counter 15 is the proper quadrant when the input of amplifier 19 is positive and the input of amplifier 20 is negative.

It will be noted that the sum of resistors 70a through 83a must be 8K. Accordingly, resistor 73a has a value of only 1K rather than its normal weighting of 8K; and the 80° output of counter 16 simultaneously actuates switches 90a, 91a, 92a, and 93a through OR circuits 50, 51, and 52. Similarly, the sum of resistors 65a through 68a must be 0.9K. Accordingly, resistor 68a has a value of 0.2K rather than its normal weighting of 0.8K; and the 8° output of counter 16 simultaneously actuates switches 86a, 87a, and 88a through OR circuits 46 and 47. These observations also apply to resistors 73b and 68b. The same principle applies to resistors 73c and 73d which, for increments of 10°, have a weighting of "one" instead of a weighting of "eight." Furthermore, resistors 68c and 68d, for 1° increments, have a weighting of "two" instead of a weighting of "eight."

Digital potentiometer 26 works satisfactorily, neglecting the action of relay contact 75a from 0° up to one count (representing 1/256°) less than 90°. All of the upper switches 76a through 93a will be opened; and all of the lower switches 76b through 93b will be closed. The only resistance between terminals 95 and 96 will be provided by resistor 55. When counter 16 is indexed to 90°, it provides no 1° or fractional degree outputs. Accordingly, contacts 76a through 88a and 76b through 88b return to the positions shown, in which appreciable resistance is provided between terminals 95 and 96. For a counter output of 90°, the 80° and 10° outputs of the counter are simultaneously present, so that AND circuit 35 energizes winding 75. This actuates contact 75a to bypass at least the 1° and fractional degree resistors normally connected in series between terminals 95 and 96. I have shown switch 75a to further bypass the 10° resistors 70b through 73b in order to eliminate the contact resistance of closed contacts 90b THROUGH 93b in series.

Digital potentiometer 23 provides correct outputs from 0° up to one count less than 90°. All of the upper switches 85c through 93c will be opened; and all of the lower switches 85d through 93d will be closed. The only resistance between terminals 98 and 99 will be provided by resistor 64d. When counter 16 is indexed to 90°, it provides no 1° outputs. Accordingly, contacts 85c through 88c and 85d through 88d return to positions shown, in which appreciable resistance is provided between terminals 98 and 99. However, this error in the resistance of potentiometer 23 at 90° introduces no adverse effect, since terminals 98 and 95 are all shorted to terminal 96 by virtue of the actuation of relay contact 75a.

It will be noted that resistors 64c and 64d are not shunted by any relay contact. These resistors provide a 0.5° offset. Digital potentiometer 23 thus provides the proper resistance value at 0.5°, 1.5°, 2.5°,...,88.5° and 89.5°. This is merely an extension of the principle shown in FIG. 2, where the curve CC steps at 10° intervals but has the correct resistance value at the midpoint between steps.

It will be recalled from FIG. 3 that for G=0.9896 the error due to steps of 10° in potentiometer 23 is ±0.86'. Accordingly, in FIG. 10c where potentiometer 23 is stepped at 1° intervals, the error is ±0.086'=±5.16". The inherent error in the circuit of FIG. 10a is ±0.45" as may be seen by reference to curve D of FIG. 4. The minimum step provided by counter 16 is 1/256°=" which corresponds to an error of ±7.04". The total error is thus 5.16+0.45+7.04=±12.65" which is less than one count of counter 16. It will be appreciated that the accuracy may be further improved by providing potentiometer 23 with fractional degree resistors and corresponding relay contacts. For example, if potentiometer 23 is stepped at intervals of 1/16°, then the error due to potentiometer 23 will be reduced to 5.16/16=±0.32". The fractional degree outputs of counter 16 should be increased by a factor of eight, so that the minimum step is 1/2048°=1.76" which corresponds to an error of ±0.88". The total error is now 0.32+0.45+0.88=±1.65" which is less than one count of counter 16.

Referring now to FIG. 13a, there is shown a circuit alternative to that of FIG. 13. The sine and cosine windings 4 and 5 are connected in series and shunted across potentiometer 26. The junction of the windings is grounded. Potentiometer 26 is shunted by an autotransformer 21a having a center tap. The slider of potentiometer 26 is connected to the armature of a chopper switch 29b. One contact of chopper switch 29b is coupled through a parallel circuit comprising capacitor 30 and inductor 25a to the center tap of autotransformer 21a. The parallel LC circuit is made resonant at the excitation frequency of, for example, 400 cycles by adjustment of capacitor 30. Autotransformer 25a is provided with a tap to introduce the respective voltage ratios 0.865474 and 0.134526. The tap of autotransformer 25a is coupled to one input of a high-gain differential amplifier 6. The output of differential amplifier 6 is applied to its other input and is further connected through a resistor 25, having a value of 0.758303R, to the other contact of chopper switch 29b and to one contact of a chopper switch 29a. The output of differential amplifier 6 is coupled to a tap, which may conveniently be a center tap, of an autotransformer 6a, one terminal of which is connected to the center tap of autotransformer 21a and the other terminal of which is coupled through a variable resistor 6b to the tap of autotransformer 25a. The other contact of chopper switch 29a is grounded; and the armature thereof is applied through amplifier 17 to synchronous detector 12. Alternating current source 2 is coupled to synchronous detector 12 and is further applied to a frequency dividing circuit 28 which reduces the frequency by a factor of 2. Frequency dividing circuit 28 drives chopper winding 29 which synchronously actuates the armatures of chopper contacts 29a and 29b.

Rheostat 6b is manually adjusted to provide sufficient positive feedback to amplifier 6 that the effective Q of the parallel resonant circuit is infinite. This adjustment may readily be determined by momentarily exciting the parallel resonant circuit and then adjusting rheostat 6b until the output of amplifier 6 neither builds up nor decays but, instead, remain constant with no detectable change in amplitude over a period of several minutes. This also compensates for losses due to the impedance of the first input of amplifier 6.

In operation of the circuit of FIG. 13a, when winding 29 is energized, the armatures of switches 29a and 29b move to their alternate positions. Switch 29b now connects the slider of potentiometer 26 to the parallel resonant circuit. Since the positive feedback through rheostat 6b renders its Q infinite, no loading is introduced on potentiometer 26; and the output voltage of amplifier 6 is a replica of that at the slider of potentiometer 26 but scaled down by the indicated voltage division provided by autotransformer 25a. This output voltage of amplifier 6 is identical to that provided by the variable autotransformer 23a of FIG. 13. The output impedance of differential amplifier 6 is very low and will be substantially zero if the differential gain is sufficiently high. When winding 29 is deenergized, the armatures of the chopper switches return to the positions shown; and the circuit of FIG. 13a now functions identically to that of FIG. 13. Because of frequency dividing circuit 28, the armatures of the chopper switches remain in each of their alternate positions for a full cycle of the alternating current input. This reduces direct current offsets in synchronous detector 12, with the chopper switches in the position shown, and assures ample time for the voltage across the parallel resonant circuit comprising capacitor 30 and inductor 25a to reach equality with the voltage at the slider of potentiometer 26, when the chopper switches are in the alternate position.

Referring now to FIG. 14, there is shown a circuit similar to FIG. 9 but in which a loading resistor 25c having a value of 2.25659819R is connected between the slider of potentiometer 23 and the short circuit across its terminals. It will be further noted in FIG. 14 that the values of resistors 21, 22, and 23 are slightly different from those in FIG. 9. In FIG. 14 resistors 21 and 22 have a value of 1.751939983R and potentiometer 23 has a value of 0.158651768R. The circuit of FIG. 14 has an error of only ±0.00106'' as shown by the curve 200H of FIG. 4. The error curve is symmetrical about 45° and exhibits four cycles of error between 0° and 90°. FIG. 14 shows the generation of the tangent as opposed to the inverse tangent of FIGS. 1, 10a, and 13a. A source 2, providing a potential of —V, is coupled to the 90° terminal of potentiometer 26. The slider of potentiometer 26 is coupled to the input of a high-gain negative-feedback amplifier 17, the output of which is applied to the 0° terminal of potentiometer 26. The output voltage of amplifier 17 will be equal to V tan A for values of A from 0° to somewhat less than 90°, since at 90° the value of the tangent increases without limit. In FIG. 14, G=1, since no Thevinin voltage is provided with movement of potentiometer 23; and the sliders of potentiometers 23 and 26 may move in either the same or opposite directions.

FIG. 15 shows a circuit equivalent to FIG. 14 in which the Thevinin voltage gain is G=2. This circuit is similar to FIG. 5. However, the slider of potentiometer 23 is connected to the junction of two loading resistors 21 and 22, each having a value of 16.98484950R, which are connected in series across potentiometer 23. The resistance value of potentiometer 23 is changed to 1.194132128R; and resistor 25 now has value of 1.751939983R. The circuit of FIG. 15 has the same error curve as that of FIG. 14.

FIG. 16 shows a circuit equivalent to that of FIG. 14 in which the voltage gain now is G=0.856540729. A source of direct current potential 2 is applied to the sine and cosine rheostats 4 and 5 in series and to potentiometer 26. Source 2 is shunted by serially connected resistors 21b and 22b, each having a value of 4.76452836R. The upper contact of chopper switch 29b is connected through a resistor 25b having a value of 14.22359314R to the junction of resistors 21b and 22b. The junction of these resistors is further connected through a chopper switch 29c to a first input of differential amplifier 6, which input is grounded through a storage capacitor 30. The junction of rheostats 4 and 5 is coupled to the lower contact of switch 29a. An alternating current source 28 of any suitable frequency drives chopper winding 29 which synchronously actuates chopper switches 29a, 29b, and 29c. Alternating current source 28 is also applied to synchronous detector 12.

FIG. 16 is similar to FIG. 13a. However, the value of G is slightly different and resistor 25 now has a value of 0.750303974R. With the chopper switches in the positions shown, the slider of potentiometer 26 is applied to the voltage dividing resistors comprising 25b, 21b, and 22b. This introduces a predetermined loading on potentiometer 26 and also produces a predetermined voltage division of the loaded output of potentiometer 26. The correction signal at the junction of resistors 21b and 22b is coupled through chopper switch 29c to the first input of differential amplifier 6 which provides an equal output voltage but at substantially zero output impedance. With the chopper switches in their alternate positions, the slider of potentiometer 26 is now connected to resistor 25 as is the input of amplifier 17. Chopper switch 29c is opened, so that storage capacitor 30 maintains the input voltage of amplifier 6 constant at its previous value. Capacitor 30 should have no leakage; and the impedance of the first input of amplifier 6 should be infinite.

The circuit of FIG. 13a may readily be altered to reduce the error to that of FIG. 16 by introducing a predetermined loading across the parallel resonant circuit so that its Q is no longer infinite. A further chopper switch 29c provided. The parallel resonant circuit is serially connected through chopper switch 29c, a resistor 25c having a value of 16.60585732R, and a switch 31 to the center tap of winding 21a. Switch 31 should now be closed; the value of resistor 25 should be changed to agree with that of FIG. 16; and the tap of inductor 25a should be changed slightly to agree with the Thevinin voltage gain G of FIG. 16.

Referring now to FIG. 17, there is shown a generator for further reducing the errors in the tangent approximation. The circuit is similar to that of FIG. 14. However, potentiometer 23 is shunted by a further short-circuited potentiometer 23b; and resistor 25c now connects the slider of potentiometer 23 to the slider of potentiometer 23b. The slider of potentiometer 23b is serially connected through a further loading resistor 25e and a switch 31a to the junction of resistors 21 and 22. In FIG. 17, the voltage gain is G=1; and the sliders of potentiometers 23 and 23b may move in either the same direction as or in an opposite direction to the slider of potentiometer 26.

As previously indicated, the circuits of FIGS. 14, 15, and 16 have an error of only ±0.00106''. This corresponds to navigating on the earth's surface to an accuracy of ±1.3 inches. This accuracy is several orders of magnitude greater than that presently achieved, since the positions of points on the earth's surface are now known only to an accuracy of ±20 feet. The resistance values for the circuit of FIG. 17 have, accordingly, not been determined. However, with switch 31a in the position shown, where resistor 25e is ineffective to load potentiometer 23b, it is estimated that the accuracy is ±0.0000016''. With switch 31a moved to its alternate position so that resistor 25e loads potentiometer 23b, it is estimated that the accuracy is ±0.0000000017''. The error curves for both positions of switch 31a will be symmetrical about 45°. With switch 31a in the position shown, the error curve will comprise five cycles of variation between 0° and 90°; and with switch 31a in its alternate position, the error curve will comprise six cycles of variation between 0° and 90°. The magnitude of the errors for the circuit of FIG. 17 were obtained from the following table:

| Curve | E | Factor | Diff. 1 | Diff. 2 |
| --- | --- | --- | --- | --- |
| J | 4.08° | | | |
| | | 132 | | |
| B | 1.86' | | 116 | |
| | | 248 | | 60 |
| D | .45'' | | 176 | |
| | | 424 | | 60 |
| H | .00106'' | | 236 | |
| | | 660 | | 60 |
| | .0000016'' | | 296 | |
| | | 956 | | |
| | .0000000017'' | | | |

In the foregoing table, it will be noted that the factor of improvement between curves J and B is 132; between curves B and D the factor is 248; and between curves D and H the factor of improvement is 424. The first order differences between these factors are 116 and 176; and the second order difference between the first order differences is 60. Assuming that the third order difference between the second order difference is zero, then the second order differences will remain 60. This establishes successive first order differences of 236 and 296. The factors of successive improvement are 660 and 956 which yield the indicated angular errors of the circuit of FIG. 17.

Referring now to FIG. 18, there is shown a circuit equivalent to that of FIG. 17 in which the Thevinin voltage gain is slightly less than the value indicated in FIG. 16. The sine and cosine windings 4 and 5 are serially connected across potentiometer 26; and the junction of the windings is grounded. Potentiometer 26 is also shunted by center tapped inductor 21a. The slider of potentiometer 26 is connected to the armature of a rotating cam switch 29b which is provided with three equally spaced stationary contacts. A first contact of switch 29b is coupled through a first parallel circuit comprising capacitor 30a and inductor 25d to the center tap of inductor 21a. Inductor 25d is provided with a tap to introduce the respective voltage ratios G' and 1−G'. The tap of inductor 25d is coupled to one input of a high-gain differential amplifier 6c. The output of amplifier 6c is coupled to its other input and to a tap, which may conveniently be a center tap, of a positive feedback inductor 6d, one terminal of which is connected to the tap of winding 21a and the other terminal of which is coupled through a variable resistor 6e to the tap of inductor 25d. The output of amplifier 6c is connected to the armature of a rotating cam switch 29c having a pair of stationary contacts spaced by 120°. A second contact of switch 29b is connected through a second parallel circuit comprising capacitor 30 and inductor 25a to the center tap of inductor 21a. Inductor 25a is provided with a tap to introduce the respective voltage ratios G and 1−G. The tap of inductor 25a is connected to one input of a high-gain differential amplifier 6. The output of amplifier 6 is coupled to its other input and to a tap of a positive feedback winding 6a, one terminal of which is connected to the tap of inductor 21a and the other terminal of which is connected through a resistor 6b to the tap of winding 25a. The output of amplifier 6 is coupled through a resistor 25 to the third contact of switch 29b. The armature of a further rotating cam switch 29a is connected through amplifier 17 to synchronous detector 12. Switch 29a is provided with three equally spaced stationary contacts. The third contact of switch 29a is connected to the third contact of switch 29b. The first and second contacts of switch 29a are grounded. The second contact of switch 29b is connected through a resistor 25c to the second contact of switch 29c. The first contact of switch 29b is serially connected through a resistor 25e and a switch 31a to the first contact of switch 29c. The alternating current input source 2 drives synchronous detector 12 and is applied to a circuit 28 which divides frequency by a factor of 3. Frequency dividing circuit 28 is coupled to a synchronous motor 29 which drives the armatures of switches 29a through 29c. The armature cams of each of the switches subtend 120°. Capacitors 30 and 30a are adjusted so that each of the parallel LC circuits are resonant at the input excitation frequency. Rheostats 6b and 6e are adjusted so that the Q's of these parallel resonant circuits are infinite.

The circuit of FIG. 18 functions similarly to the circuit of FIG. 13a. With switch 31a in the position shown, resistor 25e is ineffective to load the parallel resonant circuit comprising capacitor 30a and inductor 25d, so that the accuracy is ±0.0000016". When switch 31a is thrown to the alternate position where it is effective to load the parallel resonant circuit comprising capacitor 30a and inductor 25e, the accuracy is ±0.0000000017". Assuming that the cam switches rotate clockwise, in the positions shown, each of switches 29a and 29b breaks connection with its third contact; and each of switches 29a through 29c makes connection with its first contact. Throughout the subsequent 120° rotation of the cam switches, the slider of potentiometer 26 is coupled to the first parallel resonant circuit; and this circuit is loaded by resistor 25e, assuming switch 31a is thrown to its alternate position. After 120° of rotation from the positions shown, each of switches 29a through 29c breaks connection with its first contact and makes connection with its second contact. Throughout the subsequent 120° rotation of the cam switches, the slider of potentiometer 26 is applied to the second parallel resonant circuit; and this circuit is loaded by resistor 25c. After 240° rotation from the positions shown, each of switches 29a through 29c breaks connection with its second contact; and each of switches 29a and 29b makes connection with its third contact. Throughout the subsequent 120° of switch rotation, the slider of potentiometer 26 is loaded by resistor 25; and the slider is further coupled through switch 29a to amplifier 17.

In the circuits for G=1, let M be the values of resistors 21 and 22 of FIGS. 1, 9, 14, and 17; let N be the values of the shorted potentiometer 23 of FIGS. 9, 14, and 17, let M' be twice the value of shunting resistor 25c of FIGS. 14 and 17; let N' be the value of the shorted potentiometer 23b of FIG. 17; and let M'' be twice the value of the shunting resistor 25e of FIG. 17. Let $m$, $n$, $m'$, $n'$, and $m''$ be the equivalent values for these elements in the other circuits where G is not equal to unity. In each of these other circuits $m=GM$.

In FIG. 5 which is equivalent to FIG. 9, the value of potentiometer 23 may be determined from the equation $n=G(1+N)−1$, where G=2 and N=0.155436 as shown in FIG. 9. In FIGS. 13a and 13 which are equivalent to FIG. 9, no auxiliary potentiometer is employed; and $n=0$. Accordingly, the value of G is determined from the equation $G(1+N)=1$, where N has the value shown in FIG. 9.

In FIG. 15 which is equivalent to FIG. 14, the value of potentiometer 23 may be determined from the equation $n=G(1+N+MN/MB)−(1+G^2MN/M')$; and the values of resistors 21 and 22 may be determined from the equation $m'=nM'/GN$, where G=2 and where M, N and M' have the values indicated in FIG. 14.

In FIG. 16 which is equivalent to FIG. 14, no auxiliary potentiometer is provided; and $n=0$. Accordingly, the value of G is determined from the equation $G(1+N+MN/M')=1+G^2MN/M'$, where M, N, and M' are the values shown in FIG. 14. There are two roots for G, one of which is the value indicated in FIG. 16 and the other of which has a value of G=18.95710754. Employing the value of G indicated in FIG. 16, $m'=M'/GN$ and $m=GM$ have the values indicated in FIG. 16. If the alternate value of G is substituted into the equations for $m$ and $m'$, then the values are reversed; and $m'$ now takes on the value shown for $m$, while $m$ takes on the value shown for $m'$. This implies that the value of resistor 25b should be zero, that each of resistors 21b and 22b should have a value of 1.500607948R, that resistor 25 should have a value of 16.60585732R, and that amplifier 6 should provide a negative gain of 1−G=−17.95710754 in order to produce the alternate value of Thevinin voltage gain.

It will be noted that in FIG. 13a when switch 31 is thrown to its alternate position, resistor 25c has a value of $m'/2$. Comparing the equations for $m'$ in FIGS. 15 and 16, it will be seen that the only difference is the omission of the quantity $n$. In FIG. 16, $n=0$. However, in evaluating the quantity $m'$ in FIG. 16, it would appear that $n=1$. Actually, in FIG. 16, $n$ takes on two values, one of which is zero and the other of which is unity. The value $n=1$ obtains with the switch 29b in the position shown, where potentiometer 26 provides a square law resistance which is in series with loading resistors 25b, 21b, and 22b. However, when switch 29b is in its alternate position, no auxiliary square law potentiometer is provided supplemental to the single loading resistor 25; and $n=0$.

The transfer current ratios T associated with FIGS. 14, 15, and 16 can be written by inspection. The numerators contain the voltage terms; and the denominators contain the resistance terms. It will be noted that the denominators of the transfer current ratios T for FIGS. 14 and 15 are of similar form because of auxiliary square law impedance correction of loaded potentiometer 23. It will be further noted that the transfer current ratios T for FIGS. 15 and 16 are also of similar form because of the voltage correction by virtue that G is other than unity. The transfer current ratio for FIG. 15 will have identical from to that for FIG. 16, if $n=1$ in the voltage expression of the numerator, and if $n=0$ in the resistance expression of the denominator. The transfer current ratios for FIGS. 14, 15, and 16 may all be reduced to the expression, To, which is indicated above FIGS. 14 and 15 of the drawings. In the equation for To, $N/M'=0.035152862$; and $1+^N+MN/M'=1.220237472$.

In FIG. 17 with switch 31a in the position shown, the transfer current ratio T' may be written by inspection and includes resistive correction terms in the denominator. Also in FIG. 17 with switch 31a thrown to its alternate position, the transfer current ratio T'' may also be written by inspection and again includes resistive correction terms in the denominator.

In FIG. 18 with switch 31a in the position shown, the transfer current ratio T' may be written by inspection and includes voltage correction terms in the numerator. In FIG. 18 with switch 31a thrown to its alternate position, the transfer current ratio T'' may be written by inspection and again comprises voltage correction terms in the numerator. In FIG. 18, as in FIGS. 13a and 16, no auxiliary square law potentiometers are employed so that $n=n'=0$; and the denominators of both T' and T'' include no auxiliary resistance terms. The values of G and G' are determined from the condition that $n=n'=0$, in the same manner that the value of G in FIG. 16 was determined from the condition that $n=0$. The transfer current ratios T'' of FIGS. 17 and 18 may both be reduced to the expression To'' which is indicated underneath FIG. 18 of the drawings.

It will be noted in FIG. 18 that with switch 31a in its alternate position, loading resistor 25e is connected through cam switch 29c not to the center tap of inductor 21a but, instead, to the output of amplifier 6c which provides an output voltage equal to that at the tap of inductor 25d. Accordingly, resistor 25e, instead of having a value of $m''R/2$, has a value of $G'm''R/2$. The purpose of this is to avoid the necessity for a fourth rotating cam switch, since loading resistor 25c must be returned to the output of amplifier 6c through switch 29c. It will be appreciated that in FIG. 13a the armature of switch 31 might, instead, be connected either to the tap of inductor 25a or to the output of amplifier 6. In such event, the value of resistor 25c should be reduced to $Gm'R/2 = 14.22359314R$.

In FIGS. 17 and 18 with the armature of switch 31a in the position shown, M'' is infinite and hence P''=0. The expression for To'' thus reduces to $$To' = \frac{G[1+(P+P')w](1-z)}{G[M+(1+N+MP+MP')w+(P+P'+NP')w^2]}$$

where $P'=N'/M'$. It will be noted that the equation for To' is of the same order in $w=z-\frac{1}{2}z^2$ as the expression To. However, the w term of the numerator and the $w^2$ term of the denominator are not identical to one another in the expression for To' as they are in the expression for To.

If, in FIG. 17, potentiometer 23b is omitted so that N'=0, then P'=0; and the expression for To' reduces to that for To in FIG. 14. If in FIG. 17, resistor 25c is omitted so that M' is infinite, then P=0; and the expression for To reduces to that for Tc in FIG. 9. It will be noted that the equation for Tc is of the same order in $w=z-\frac{1}{2}z^2$ as the expression Ta. However, in the expression for Tc the multiplier for the w term of the denominator is not merely unity as it is in the expression for Ta. If, in FIG. 17, potentiometer 23 is omitted so that N=0, then the expression for Tc reduces to that for Ta in FIG. 1. If, in FIG 17, resistors 21 and 22 are omitted so that M is infinite, then the transfer current ratio is T=0 as previously indicated with curve J.

In the various circuits for G=1, the sequence of values is shown in the following table

| Curve | M | N | M' | N' | M'' | N'' |
|---|---|---|---|---|---|---|
| J | ∞ | 0 | ∞ | 0 | ∞ | 0 |
| B | 1.8015 | 0 | ∞ | 0 | ∞ | 0 |
| D | 1.7523 | 0.155 | ∞ | 0 | ∞ | 0 |
| H | 1.7519 | 0.159 | 4.51 | 0 | ∞ | 0 |
| | less | more | less | more | ∞ | 0 |
| | less | more | less | more | less | 0 |
| | less | more | less | more | less | more |

In the various circuits where $n=n'=n''=0$, the sequence of values is shown in the following table where $m=GM$.

| Curve | m | G | m' | G' | m'' | G'' |
|---|---|---|---|---|---|---|
| J | ∞ | 1 | ∞ | 1 | ∞ | 1 |
| B | 1.8015 | 1 | ∞ | 1 | ∞ | 1 |
| D | 1.5166 | 0.865 | ∞ | 1 | ∞ | 1 |
| H | 1.5006 | 0.857 | 33.2 | 1 | ∞ | 1 |
| | less | less | less | less | ∞ | 1 |
| | less | less | less | less | less | 1 |
| | less | less | less | less | less | less |

In both tables, the N'' and G'' entries represent an extension beyond the circuits of FIGS. 17 and 18. It has been found that when the second table is extended indefinitely, the value of m is still greater than 3 seconds.

From the expressions Ta, Tc, To, To', and To'', it will be seen that the general expression for the transfer current ratio is $$T_x = \frac{(N_0 + N_1 w + N_2 w^2 + \ldots + N_x w^x)(1-z)}{D_0 + D_1 w + D_2 w^2 + \ldots + D_x w^x + D_{x+1} w^{x+1}}$$

In the expressions Ta and Tc, $x=0$; in the expressions To and To', $x=1$; and in the expression To'', $x=2$. In the expressions Ta, To, and To'' it will be noted that $D_{x+1}$ is equal to $N_x$, while in the expressions Tc and To', $D_{x+1}$ is greater than $N_x$. The value of x may be increased as desired to obtain any required degree of accuracy.

Where the various circuits are mechanized by resistance networks in the manner shown, then, where a potentiometer is employed, it is preferable that it be shunted by a loading resistor since the accuracy is increased without any additional complexity. Accordingly, the circuits of FIGS. 1 and 14 through 16 are preferred. Similarly, the circuits of FIGS. 13a, 17 and 18 are also preferred when switches 31 and 31a are thrown to their alternate positions so that the loading resistors are connected.

However, the various equations may also be mechanized by a digital computer. As a matter of fact, the indicated values of the resistors and the constants for the equations were obtained by the use of a digital computer. I have found that the use of equations of the form given converges far more rapidly upon the value of the tangent than does the normal series expansion $$\tan A = A + \frac{A^3}{3} + \frac{2A^5}{15} + \ldots + \frac{2^{2n}(2^{2n}-1)B_n A^{2n-1}}{(2n)!}$$

where B is a Bernoulli number such that $B_1=1/6$, $B_2=1/30$, $B_3=1/42$, and $$B_n = \frac{(2n)!}{\pi^{2n}(2^{2n-1}-1)}\left[1 - \frac{1}{2^{2n}} + \frac{1}{3^{2n}} - \frac{1}{4^{2n}} + \ldots\right]$$

Accordingly, far less computer time is required in solving for the tangent by employing equations of the form shown. When the equations are mechanized by the use of a digital computer, then it is preferable to use equations of the form shown in FIGS. 5 through 12, since a smaller power of $w=z-\frac{1}{2}z^2$ is required. Similarly, the equations for the circuits of FIGS. 13a, 17, and 18 are preferred with switches 31 and 31a in the positions shown, again because of the smaller powers of w. Thus, when the equations are mechanized by a digital computer, it is preferable to use equations corresponding to circuits where the potentiometers are not shunted by loading resistors.

It will be appreciated that any of the fragmentary function generators may be used either to generate the inverse tangent as in FIGS. 1, 10a, 13a, 16, and 18, or may alternatively be used to generate the tangent as in FIG. 14.

It will be seen that I have accomplished the objects of my invention. I may generate both the tangent and the inverse tangent to any desired degree of accuracy. The inverse tangent generator is operable from 0° through 360°; and the tangent generator is operable from 0° through nearly 90°. Where resistance networks are employed, relatively few variable elements are required even for extremely high accuracies; and time sharing permits these accuracies to be obtained with only one variable element. Where the equations are mechanized by a digital computer, much less computer time is required for obtaining the tangent to any given degree of accuracy than does the use of the standard series expansion involving Bernoulli numbers.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A function generator including in combination first means for providing a first quantity proportional to $z+Tw$ and a second quantity proportional to $2-z-Tw$, the first means comprising means for providing a quantity T proportional to $$\frac{(N_0+N_1w+N_2w^2+\ldots+N_xw^x)(1-z)}{D_0+D_1w+D_2w^2+\ldots+D_xw^x+D_{x+1}w^{x+1}}$$

where $N_0=1$, where $D_o$ is at most 1.7525, and where $D_1$ is at least 1.1553, and second means for determining the ratio of the first quantity to the second quantity as an approximation to the tangent of an angle A ranging between 0° and 90°, where $z=A/45$ and where $w=z-\frac{1}{2}z^2$.

2. A generator as in claim 1 wherein $x$ is at least 1, wherein $N_1$ and $D_2$ are each at least 0.035151, wherein $D_o$ is at most 1.751942, and wherein $D_1$ is at least 1.220236.

3. A generator as in claim 1 wherein $D_{x+1}$ is greater than $N_x$.

4. An inverse tangent generator including in combination a linear potentiometer having a resistance R and a 0° terminal and a 90° terminal and a slider, first input means providing a potential proportional to the sine of an angle A ranging between 0° and 90°, second input means providing a potential proportional to the cosine of such angle, means connecting the first and second input means in series to provide a resultant potential E, means applying the resultant potential across the terminals of the potentiometer, means connected to the slider for drawing therefrom a current proportional to $$\frac{(E/R)(N_0+N_1w+N_2w^2+\ldots N_xw^x)(1-z)}{D_0+D_1w+D_2w^2+\ldots+D_xw^x+D_{x+1}w^{x+1}}$$

where $z=A/45$, where $w=z-\frac{1}{2}z^2$, where $N_o=1$, where $D_o$ is at most 1.8301, and where $D_1$ is at least unity, means for comparing the voltage at the slider with the voltage at the junction of the first and second input means, third input means for positioning the slider in accordance with such angle, and means responsive to the comparing means for controlling one of said input means.

5. A generator as in claim 4 wherein $x=0$, wherein $D_o$ is approximately equal to 1.8015, and wherein $D_1$ is equal to unity.

6. A generator as in claim 4 wherein $x=0$, wherein $D_o$ is approximately equal to 1.752342, and wherein $D_1$ is approximately equal to 1.155436.

7. A generator as in claim 4 wherein $x$ is at least 1, wherein $N_1$ and $D_2$ are each at least 0.035151, wherein $D_o$ is at most 1.751942, and wherein $D_1$ is at least 1.220236.

8. A generator as in claim 4 wherein $D_{x+1}$ is equal to $N_x$.

9. A generator as in claim 4 which further includes means for selectively reversing the potentials and the order of series connection of the first and second means.

10. In a function generator including in combination a first linear potentiometer having a 0° terminal and a 90° terminal and a slider, a source of potential, means applying the source to the 90° terminal of the potentiometer, means including the source for providing a voltage across the terminals of the potentiometer, means connected to the slider for drawing therefrom a transfer current proportional to $$\frac{(N_0+N_1w+N_2w^2+\ldots+N_xw^x)(1-z)}{D_0+D_1w+D_2w^2+\ldots+D_xw^x+D_{x+1}w^{x+1}}$$

where A is an angle ranging between 0° and 90°, where $z=A/45$, where $w=z-\frac{1}{2}z^2$, where $N_o=1$, where $D_o$ is at most 1.7525, and where $D_1$ is at least 1.1553, and means for positioning the slider in accordance with such angle.

11. A generator as in claim 10 wherein $x$ is at least 1, wherein $N_1$ and $D_2$ are each at least 0.035151, wherein $D_o$ is at most 1.751942, and wherein $D_1$ is at least 1.220236.

12. A generator as in claim 10 wherein $D_{x+1}$ is equal to $N_x$.

13. A generator as in claim 10 wherein the transfer current means includes means for providing a voltage opposing the flow of transfer current and of such magnitude that the ratio of the resultant voltage to the slider voltage is approximately equal to 0.9896.

14. A generator as in claim 10 wherein $x=0$ and wherein the transfer current means includes means for providing a voltage opposing the flow of transfer current and of such magnitude that the ratio of the resultant voltage to the slider voltage is approximately equal to 0.865474.

15. A generator as in claim 10 wherein $x$ is at least 1 and wherein the transfer current means includes means for providing a voltage opposing the flow of transfer current and of such magnitude that the ratio of the resultant voltage to the slider voltage is at most 0.856542 for $2=0$ and $z=0$.

16. A generator as in claim 10 wherein the voltage providing means includes means comprising a high negative gain amplifier for coupling the slider to the 0° terminal of the potentiometer.

17. A generator as in claim 10 wherein the transfer current means comprises a storage circuit having an input and providing an output, means including a switching device for selectively connecting the slider to the input and to the output of the storage circuit, and means for periodically actuating the switching device.

18. A generator as in claim 10 wherein $x=0$ and wherein the transfer current means comprises a short-circuited potentiometer having a resistance value which is approximately equal to 0.155436 times the resistance of the first potentiometer.

19. A generator as in claim 10 wherein $x$ is at least 1 and wherein the transfer current means comprises a short-circuited potentiometer having a resistance value which is at least 0.158650 times the resistance of the first potentiometer.

20. A generator as in claim 10 wherein $x=0$ and wherein the transfer current means comprises a second potentiometer shunting the first and having a resistance value which is approximately equal to 1.310872 times the resistance of the first potentiometer.

21. A generator as in claim 10 wherein $x$ is at least 1 and wherein the transfer current means comprises a second potentiometer shunting the first and having a resistance value which is at most 1.194134 times the resistance of the first potentiometer.

22. A generator as in claim 10 wherein the transfer current means includes means for providing a voltage aiding the flow of transfer current.

23. A generator as in claim 10 wherein the transfer current means includes means for providing a voltage of such polarity and magnitude that the ratio of the resultant voltage to the slider voltage has a value which is greater than 0.855 but less than 19.

PO-1050
(5/69)

UNITED STATES PATENT OFFICE
CERTIFICATE OF CORRECTION

Patent No. 3,601,593      Dated August 24, 1971

Inventor(s) FRANK S. PRESTON

It is certified that error appears in the above-identified patent and that said Letters Patent are hereby corrected as shown below:

Column 15, line 27:
"$N_o-1$"    Should read: -- $N_o=1$ --

Column 16, line 9:
"$z=A/4$"    Should read: -- $z=A/45$ --

Column 16, line 10:
"5" at the beginning of the line should be deleted.

Same line:
"$N_o1$"    Should read: -- $N_o=1$ --

Column 16, line 31:
"$2=0$"    Should read -- $z=0$ --

Same line:
"$z=0$"    Should read -- $z=2$ --

Signed and sealed this 14th day of March 1972.

(SEAL)
Attest:

EDWARD M. FLETCHER, JR.
Attesting Officer

ROBERT GOTTSCHALK
Commissioner of Patents